United States Patent [19]

Jacob et al.

[11] Patent Number: 4,738,474
[45] Date of Patent: Apr. 19, 1988

[54] PIPE JOINT CONNECTION

[75] Inventors: Gernot Jacob, Weissach; Leon Radom, Ellhofen, both of Fed. Rep. of Germany

[73] Assignee: Progress-Elektrogeraete Mauz & Pfeiffer GmbH & Co., Nuertingen, Fed. Rep. of Germany

[21] Appl. No.: 884,506

[22] Filed: Jul. 11, 1986

[30] Foreign Application Priority Data

Jul. 12, 1985 [DE] Fed. Rep. of Germany ....... 3524987

[51] Int. Cl.⁴ ............................................. F16L 39/00
[52] U.S. Cl. ......................................... 285/7; 285/93; 285/319; 285/921
[58] Field of Search ....................... 285/5, 7, 319, 320, 285/330, 921, 93

[56] References Cited

U.S. PATENT DOCUMENTS 2,755,106  7/1956  Brenna et al. .......................... 285/7
3,244,437  4/1966  Belicka et al. .......................... 285/7
3,733,577  5/1973  Hammond ...................... 285/921 X

FOREIGN PATENT DOCUMENTS 945049   6/1956  Fed. Rep. of Germany .......... 285/7
1183755 12/1964  Fed. Rep. of Germany .......... 285/7

*Primary Examiner*—Dave W. Arola
*Attorney, Agent, or Firm*—Birch, Stewart, Kolasch & Birch

[57] ABSTRACT

The pipe joint connection, in which one of the pipes to be connected is inserted into the other pipe, has a click-stop arrangement for maintaining the connection, which click-stop arrangement comprises two stop webs extending conically with respect to each other and being mounted on the outside of one pipe and two resilient tongues mounted on the outside of the other pipe. When the two pipes are being connected, the resilient tongues pass between the stop webs, whereby they are moved towards each other and, when being in the stop location, engage with the backsides of the stop webs.

16 Claims, 2 Drawing Sheets

PIPE JOINT CONNECTION

BACKGROUND OF THE INVENTION

The invention relates to a pipe joint connection, particularly between the socket or connecting tube of a vacuum cleaner housing and the socket or connecting tube of a vacuum cleaner handle, a nozzle or an accessory device, in which pipe joint connection one of the pipes to be connected is inserted into the other pipe, and which has a click-stop arrangement for maintaining the pipe joint connection and protecting it against torsion.

The hitherto known vacuum cleaners have pipe joint connections for example between a guide tube backwardly projecting from the vacuum cleaner housing and a connecting tube of a vacuum cleaner handle, in which connection the two pipes are inserted into each other, and for maintaining and protecting the pipe joint connection against torsion a latch of one pipe enters into a notch of the other pipe. Such design has the disadvantage that it may be time-consuming to let the latch enter the notch as the latch is not visible when the pipes are in the assembled condition. When the spring which impinges on the latch has a considerable force so that the pipe joint connection is reliably maintained, it may prove circumstantial and difficult to release the click-stop connection, whereas in those cases when only a minor spring tension must be overcome, particularly the protection against torsion of the pipe joint connection is not reliably provided when major torques occur in said connection. Besides that, hitherto the pipes of the pipe joint connections provided with a latch and a notch consist of metal, so that a vacuum cleaner, whose housing is commonly made of plastic material, must be composed of various materials.

OBJECT OF THE INVENTION

It is the object of the invention to improve a pipe joint connection as described in the preamble of claim 1 in a way that the pipes may be easily connected and released by the operating person and to provide reliable maintenance and protection against torsion of the pipe joint connection.

According to the invention this object is achieved by the features recited in the characterizing clause of claim 1.

SUMMARY OF THE INVENTION

The pipe joint connection has a click-stop arrangement comprising two resilient tongues on the outside of the pipe having the smaller diameter and two stop webs on the outside of the pipe having the larger diameter, which are disposed at such places that, when the pipes are being inserted into each other, the tongues pass between the stop webs, engaging with the backsides thereof when the pipes are in the assembled condition. As both the stop webs and the resilient tongues are visible when the pipes are being assembled, the time-consuming and inconvenient search for the stop location may be avoided in such a design. The pipe joint connection may likewise easily be released as only the resilient tongues engaging the stop webs need to be disengaged from said stop webs by a working step requiring only to overcome the relatively small elastic force of the tongues.

Preferably the stop webs extend conically with respect to each other in the axial direction of the pipe, their inside distance at the first end section substantially disposed at the pipe end being larger and at the second end section being smaller than the outside distance of the resilient tongues. When the pipes are being assembled, the resilient tongues passing between the stop webs are pressed towards each other unitl the stop location is reached, whereupon, due to their elastic force, they move again apart, thus safely and reliably engaging with the backsides of the stop webs. Suitably the resilient tongues are arranged substantially parallel to each other and to the longitudinal axis of the pipe.

According to a further embodiment of the invention either of the stop webs comprises an outwardly angular edge section at the end section which is averted from the pipe end, said outwardly angular edge section serving as click-stop. At the end sections averted from the pipe end the resilient tongues are fastened to the pipe and extend therefrom freely towards the pipe end.

According to a further preferred embodiment of the invention either tongue has a clearance in the axial mid-section for receiving - relatively seen - in the stop location the pertinent stop web. In the stop location a graduatedly enlarged press-key forming the front section of the tongue faces the annular edge section of the pertinent stop web by the backward face extending substantially perpendicularly to the pipe axis. When the pipes to be connected are being assembled, in such a design the graduatedly enlarged front press-keys pass between the stop webs extending conically with respect to each other, so that the presskeys together with the following portions of the resilient tongues are caused to move towards each other. When the backward faces of the press-keys reach the rear angular edge section of the stop webs, the tongues may move back into their original positions due to their elasticity, because the stop webs may enter into the respective clearances when the tongues are caused to move in this way. In this stop location the backward faces of the press-keys are facing the angular edge sections of the stop webs, whereby the pipe joint connection can be safely maintained. The stop location may easily and conveniently be released by pressing the press-keys towards each other so that the tongues may be withdrawn between the stop webs.

In the stop location the stop web suitably enters into the clearance of the respective tongue with a minor backlash. Further, in the stop location the press-keys are suitably spaced from the outside of the opposite pipe in a manner that for releasing the pipe joint connection they may be moved towards each other without getting into contact with the outside of the pipe. Thereby the press-keys may conveniently be bent inwardly without meeting any obstacle.

Further, according to the invention either press-key comprises a projecting tenon, while on the opposite pipe behind the stop webs there is arranged a crossbar extending transversely to the axis of the pipe, which crossbar is in engagement with the tenons when the pipe joint connection is in the assembled condition. Such design has the advantage that the stop location cannot be released by applying a considerably traction, which might otherwise result in that by a respective deformation of the resilient tongues the press-keys might be lifted and withdrawn over the stop webs. In such an undesirable operation the resilient tongues might also be considerably damaged. Owing to the engagement of the tenons with the crossbar the press-keys are safely prevented from being lifted and removed, and simultaneously such measure also provides a protection of the assembled pipes against torsion.

In the pipe having the larger diameter there may also be provided an annular plug-in limitation for the pipe having the smaller diameter. Such a plug-in limitation is also provided by the crossbar arranged behind the stop webs.

It is expedient to design the socket of the vacuum cleaner housing as the pipe having the larger diameter of the two pipes constituting the pipe joint connection, said pipe being provided with the stop webs.

According to a further proposal of the invention the tongues, the stop webs and the crossbar as well as the pertinent pipes may be of plastic material and integral with these parts. Thus, the pipes of the vacuum cleaner may be of the same material as the housing and the handle of the vacuum cleaner.

BRIEF DESCRIPTION OF THE DRAWINGS

Further features, advantages and details of the invention will become apparent from the following description of some of the preferred embodiments and with reference to the drawings in which.

DETAILED DESCRIPTION OF A PREFERRED EMBODIMENT

Figure 1:
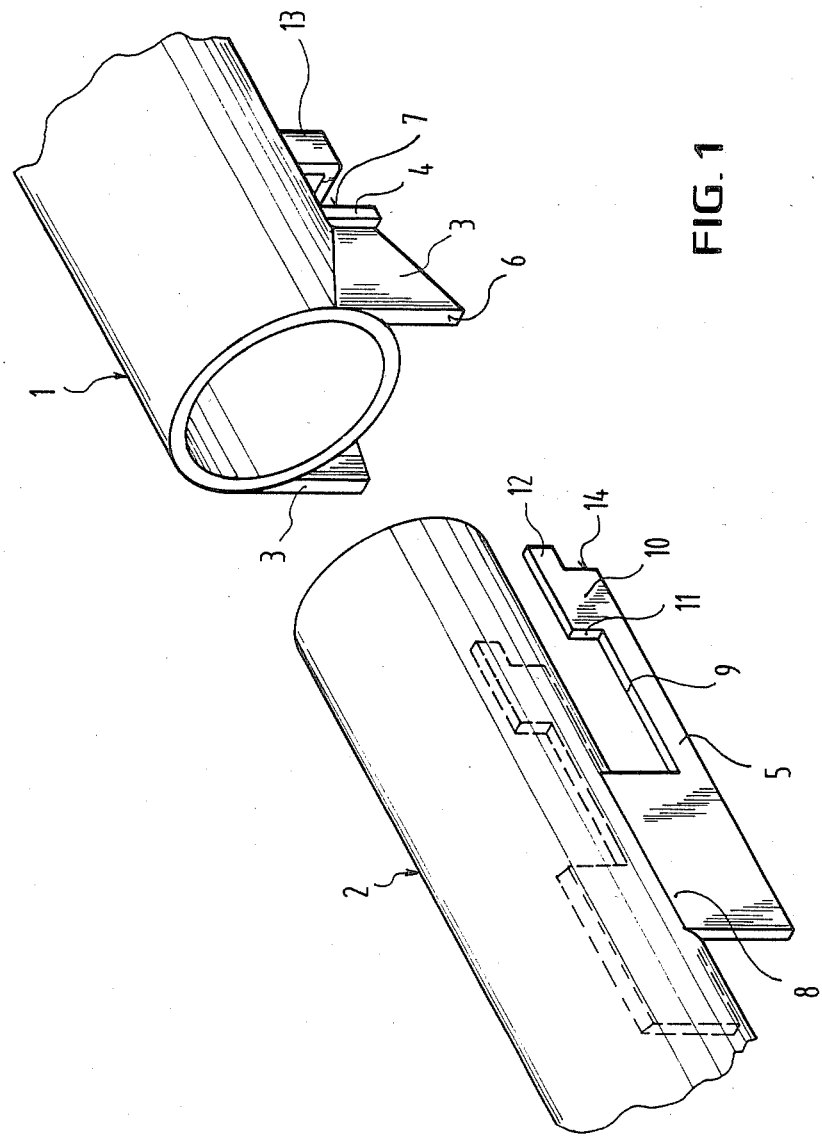
FIG. 1 is a perspective view of an embodiment of the pipe joint connection according to the invention prior to assembling the two pipes.
Figure 2:
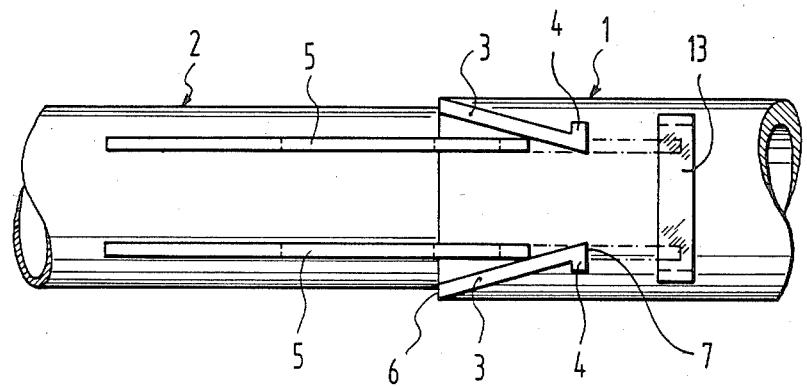
FIG. 2 is a schematic view from below to the pipe joint connection according to FIG. 1 in an intermediate position on assembling the pipes.
Figure 3:
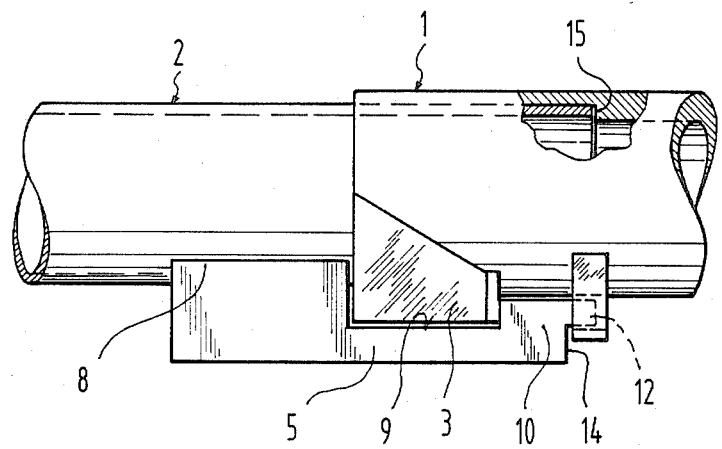
FIG. 3 is a schematic lateral view of the pipe joint connection according to FIG. 1 in the assembled condition.

FIG. 1 shows two pipes 1 and 2, which are to be connected with each other by inserting the pipe 2 of smaller diameter into the pipe 1 of larger diameter. On the pipe 1 of larger diameter there are integrally molded two stop webs 3 extending conically with respect to each other in the axial direction of the pipe, as particularly to be seen in FIG. 2. At its end section averted from the pipe end either stop web 3 has an outwardly angular edge section 4 serving as click-stop. On the pipe 2 of smaller diameter there are integrally molded two resilient tongues 5 which are arranged substantially parallel to each other and to the pipe axis. The resilient tongues 5 are arranged at a distance from each other which is smaller than the distance of the conically extending stop webs 3 at their front end sections 6 situated at the pipe end, but which is larger than the distance of the stop webs 3 at their rear end portions 7. When obtaining the pipe joint connection the pipe 2 is inserted into the pipe 1, the resilient tongues 5 will enter into the clearance between the two stop webs 3, thus being progressively pressed towards each other as to be seen in FIG. 2.

At their end sections 8 averted from the pipe end the resilient tongues 5 are fastened to the pipe 2, extending therefrom freely towards the pipe end. In their axial mid-section either resilient tongue 5 has a clearance 9, which is so dimensioned that in the stop location the pertinent stop web, relatively seen, may enter into said clearance 9 when the resilient tongues 5, which were beforehand inwardly bent, take their original alignment.

The resilient tongues 5 further comprise a graduatedly enlarged front press-key 10, whose backward face 11 is in the stop location abutting to the angular edge section 4 of the pertinent stop web 3. Thus, the maintenance of the pipe joint connection is safely provided. When, however, the pipe joint connection is to be released, the press-keys 10 are moved towards each other only to an extent such that they are no longer facing the angular edge sections 4 of the stop webs 3, whereupon the pipe 2 may be removed from the pipe 1, and the resilient tongues 5 may be removed between the stop webe 3.

On the press-keys 10 there is integrally molded a projecting tenon 12 which in the stop location engages with a crossbar 13 arranged behind the stop webs 3 and extending transversely to the axis of the pipe 1. The top edge of the tenon 12 facing the top edge of the pipe 2 is flush with the top edge of the press-key 10.

The front faces 14 of the press-keys 10 in combination with the crossbar 13 represent a plug-in limitation for the pipe 2. A further plug-in limitation is an annular plug-in limitation 15 arranged in the pipe 1.

We claim:

1. Releasable pipe joint connection, particularly between two pipes on a suction side of a vacuum cleaner, wherein one of the pipes to be connected is inserted into the other pipe, with a securing arrangement for maintaining the pipe joint connection and protecting it against torsion, characterized in that the securing arrangement comprises two stop webs arranged on the outside of one pipe and two resilient tongues arranged on the outside of the other pipe, said two resilient tongues pass between the stop webs and in a stop location engage with a portion of said stop webs for securing said two pipes together.

2. Pipe joint connection according to claim 1, characterized in that the stopwebs (3) extend conically with respect to each other in the axial direction of the pipe (1), their inside distance at a first end section (6) substantially disposed at the pipe end being larger and at the second end section (7) being smaller than the outside distance of the resilient tongues (5).

3. Pipe joint connection according to claim 2, characterized in that one of the stop webs (3) comprises at a second end section (7) an outwardly bent angular edge section (4) serving as click-stop.

4. Pipe joint connection according to claim 2, characterized in that the resilient tongues (5) are arranged substantially parallel to each other and to the longitudinal axis of the pipe.

5. Pipe joint connection according to claim 2, characterized in that at their end sections averted from the pipe end the resilient tongues (5) are fastened to the pipe(2) and therefrom extend freely toward the pipe end.

6. Pipe joint connection according to claim 3, characterized in that one of the tongues (5) has a clearance (9) in its axial mid-section for receiving - in the stop location the pertinent stop web (3), while a graduatedly enlarged press-key (10) forming the front end section of the tongue faces the angular edge section (4) of the pertinent stop web.

7. Pipe joint connection according to claim 1, characterized in that the resilient tongues (5) are arranged substantially parallel to each other and to the longitudinal axis of the pipe.

8. Pipe joint connection according to claim 7, characterized in that at their end sections averted from the pipe end the resilient tongues (5) are fastened to the pipe (2) and therefrom extend freely towards the pipe end.--

9. Pipe joint connection according to claim 1, characterized in that at their end sections averted from the pipe end the resilient tongues (5) are fastened to the pipe (2) and therefrom extend freely towards the pipe end.

10. Pipe joint connection according to claim 6, characterized in that in the stop location the stop web (3) enters into the clearance (9) of the pertinent tongue (5) with a slight tolerance when the stop web enters the clearance.

11. Pipe joint connection according to claim 6, characterized in that in the stop location the press-keys (10) are spaced from the outside of the opposite pipe (1) in a manner that for releasing the pipe joint connection they may be moved towards each other without coming into contact with the outside of the pipe (1).

12. Pipe joint connection according to claim 1, further characterized by a projecting tenon (12) arranged on either press-key (10) and a crossbar (13) attached to said one pipe having said stop webs and extending transversely to the axis of the pipe and being arranged behind the stop webs (3), which crossbar is in engagement with the tenons when the pipe joint connection is in the assembled condition.

13. Pipe joint connection according to claim 1, characterized in that in the pipe (1) of larger diameter includes a stop for limiting the insertion of the pipe (2) of small diameter.

14. Pipe joint connection according to claim 1, characterized in that a socket of a vacuum cleaner housing is the pipe having the larger diameter.

15. Pipe joint connection according to claim 12, characterized in that the tongues (5), the stop webs (3) and the crossbar (13) as well as the pertinent pipes (1, 2) are of plastic material and integral therewith.

16. A releasable pipe joint connection, particularly for use between two pipes on a suction side of a vacuum cleaner comprising:

a first pipe having a predetermined diameter;

a second pipe having a diameter for permitting said first pipe to be inserted therein;

a securing arrangement for connecting said first and second pipes together and for protecting the pipes against torsion, said securing arrangement comprising:

two stop webs arranged on the outside of one of said first or second pipes; and two resilient tongues arranged on the outside of the other of said first or second pipes;

said resilient tongues being positioned for passing between the stop webs and extending freely towards said stop webs for engaging with a portion of said stop webs when assembled in a stop location for securing said first and second pipes together.

* * * * *